United States Patent
Ikeda et al.

(10) Patent No.: US 10,268,111 B2
(45) Date of Patent: Apr. 23, 2019

(54) PHOSPHOR WHEEL, LIGHT SOURCE DEVICE, AND PROJECTOR-TYPE IMAGE DISPLAY APPARATUS

(71) Applicant: Panasonic Intellectual Property Management Co., Ltd., Osaka (JP)

(72) Inventors: Takashi Ikeda, Osaka (JP); Masafumi Tanaka, Osaka (JP); Shigekazu Yamagishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 28 days.

(21) Appl. No.: 15/450,244

(22) Filed: Mar. 6, 2017

(65) Prior Publication Data
US 2017/0269461 A1    Sep. 21, 2017

(30) Foreign Application Priority Data

Mar. 15, 2016  (JP) ................................ 2016-050338
Feb. 10, 2017  (JP) ................................ 2017-022744

(51) Int. Cl.
*G02B 26/00*  (2006.01)
*G03B 21/20*  (2006.01)

(52) U.S. Cl.
CPC ......... *G03B 21/204* (2013.01); *G02B 26/008* (2013.01)

(58) Field of Classification Search
CPC ........................... G02B 26/008; G03B 21/204
USPC ......................................................... 362/84
See application file for complete search history.

(56) References Cited

U.S. PATENT DOCUMENTS

| | | | | |
|---|---|---|---|---|
| 4,400,161 A | * | 8/1983 | Gerlt | G01J 3/522 190/11 |
| 2005/0128614 A1 | * | 6/2005 | Kao | G02B 26/008 359/892 |
| 2006/0028746 A1 | * | 2/2006 | Niwa | G02B 26/008 359/892 |
| 2007/0211180 A1 | * | 9/2007 | Hur | H04N 9/3114 348/744 |
| 2011/0310363 A1 | * | 12/2011 | Kita | G03B 21/204 353/98 |
| 2013/0286359 A1 | | 10/2013 | Motoya et al. | |
| 2016/0077326 A1 | * | 3/2016 | Yamagishi | G02B 26/008 353/61 |
| 2016/0091712 A1 | * | 3/2016 | Egawa | G03B 21/204 353/31 |
| 2016/0091782 A1 | * | 3/2016 | Hashizume | G03B 21/208 353/84 |
| 2016/0165194 A1 | * | 6/2016 | Hartwig | G02B 26/008 353/31 |
| 2016/0252722 A1 | * | 9/2016 | Li | G02B 26/008 362/84 |
| 2017/0175989 A1 | * | 6/2017 | Yamagishi | G03B 33/08 |

FOREIGN PATENT DOCUMENTS

JP         2013-228598 A    11/2013

* cited by examiner

*Primary Examiner* — Tsion Tumebo
(74) *Attorney, Agent, or Firm* — McDermott Will & Emery LLP

(57) ABSTRACT

A phosphor wheel includes a disc-shaped substrate and a phosphor ring fixedly bonded to the substrate. At least three cut-out sections or openings are formed on a rim of the substrate. The shortest length from the center of the substrate to inner edges of the cut-out sections or inner edges of the openings is generally equal to a radius of an outer circumference of the phosphor ring.

20 Claims, 13 Drawing Sheets

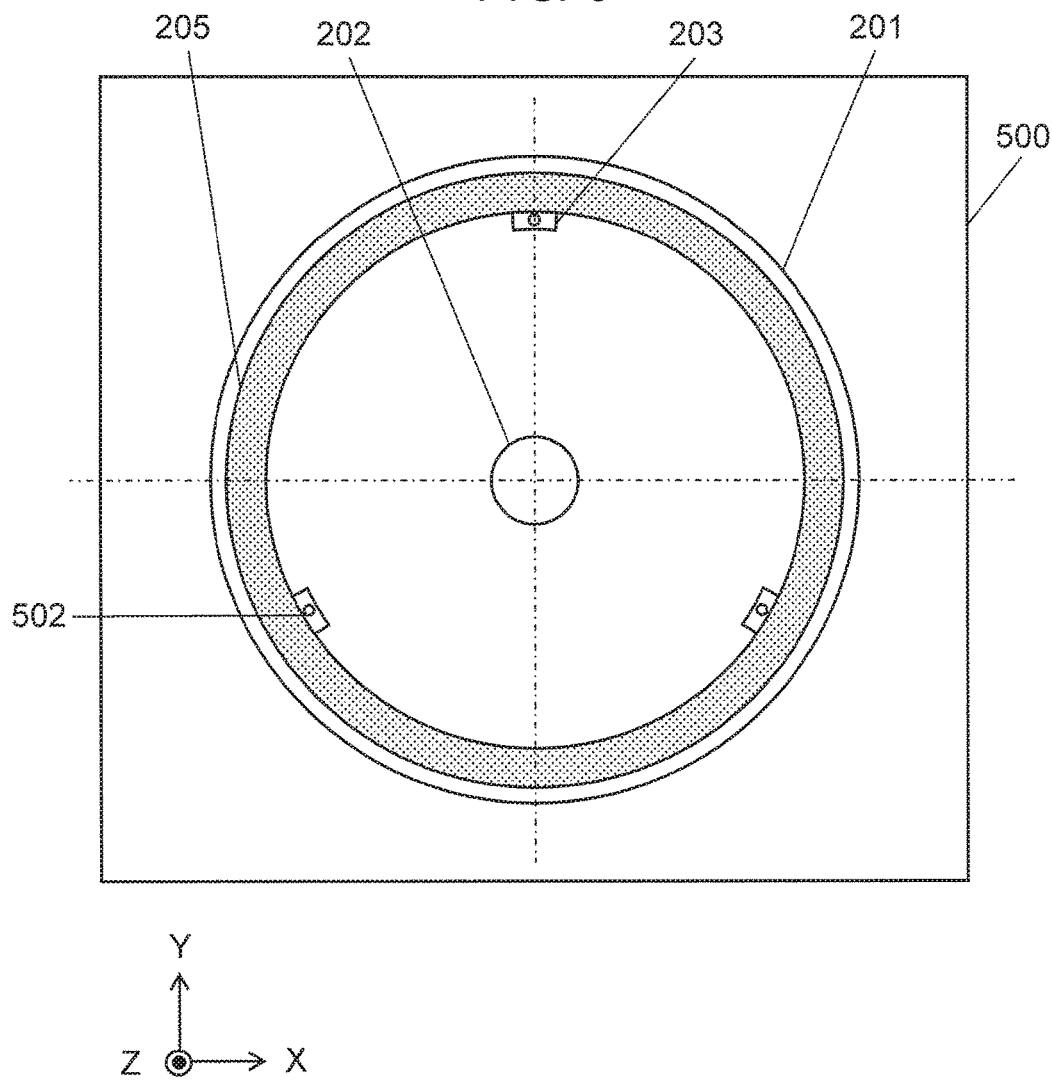

PHOSPHOR WHEEL, LIGHT SOURCE DEVICE, AND PROJECTOR-TYPE IMAGE DISPLAY APPARATUS

RELATED APPLICATIONS

This application claims the benefit of Japanese Application No. 2016-050338, filed on Mar. 15, 2016, and Japanese Application No. 2017-022744, filed on Feb. 10, 2017, the disclosures of which are incorporated by reference herein.

TECHNICAL FIELD

The present disclosure relates to a phosphor wheel to be used, for instance, in a light source device of a projector-type image display apparatus.

DESCRIPTION OF THE RELATED ART

Patent literature 1 discloses a structure of a phosphor wheel comprising a substrate on which a titanium oxide layer is formed, and a phosphor layer formed on the titanium oxide layer. This phosphor wheel forms a fluorescent light emitting plate comprising the following structural elements:
  a fluorescent light emitting section confronting an excitation light source, and
  a reflective section disposed opposite to the excitation light source so as to join with the fluorescent emitting section, and containing titanium oxide. Since this phosphor wheel includes the reflective section, illuminating the fluorescent light emitting section with outgoing excitation light from the excitation light source causes the fluorescent light emitting section to emit fluorescent light, and the reflective section emits reflected fluorescent light. This structure thus increases a use-efficiency of the fluorescent light. Since the reflective section is formed by providing the titanium oxide layer onto the substrate, the phosphor wheel can achieve a lower cost.

CITATION LIST

Patent Literature 1: Unexamined Japanese Patent Application Publication No. 2013-228598

SUMMARY

The present disclosure aims to provide a phosphor wheel that can be built with an accurate positioning between the phosphor layer and the substrate. The phosphor wheel of the present disclosure comprises the following structural elements:
  a disc-shaped substrate; and
  a phosphor ring fixedly bonded to the substrate.
The substrate includes at least three cut-out sections or openings at a rim of the substrate, and the shortest distance from the substrate center to inner edges of the cut-out sections or the openings is generally equal to a radius of the outer circumference of the phosphor ring. The structure discussed above allows achieving an accurate positioning between the phosphor layer and the substrate of the phosphor wheel.

BRIEF DESCRIPTION OF THE DRAWINGS

FIG. 9 is a plan view illustrating the substrate, used in the second embodiment, mounted to the positioning jig.

DETAILED DESCRIPTION

Exemplary embodiments of the present disclosure are demonstrated in detail hereinafter with reference to the accompanying drawings. Descriptions more than necessary are omitted, and the descriptions of well-known matters and duplicative descriptions of substantially the same matters are also sometimes omitted here. These omissions will avoid redundancy in the descriptions and help the ordinary skilled persons in the art understand the present disclosure with ease.

The accompanied drawings and the descriptions below are provided for the ordinary skilled persons in the art to fully understand the present disclosure, and these materials do not limit the scope of the claims listed below.

First Exemplary Embodiment 1-1. Structure of Phosphor Wheel and Method for Manufacturing the Phosphor Wheel The phosphor wheel in accordance with the first embodiment is demonstrated hereinafter with reference to FIG. 1A-FIG. 6B.

Figure 1A:
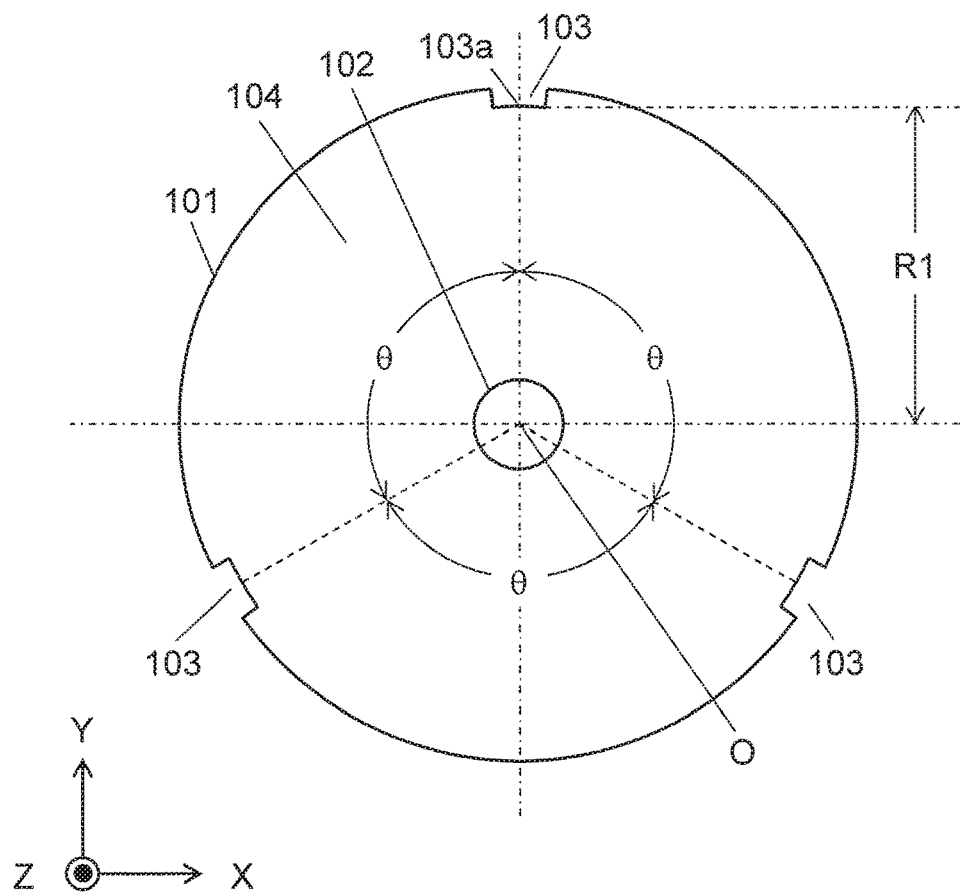
FIG. 1A is a plan view of a substrate in accordance with a first embodiment of the present disclosure.
Figure 1B:
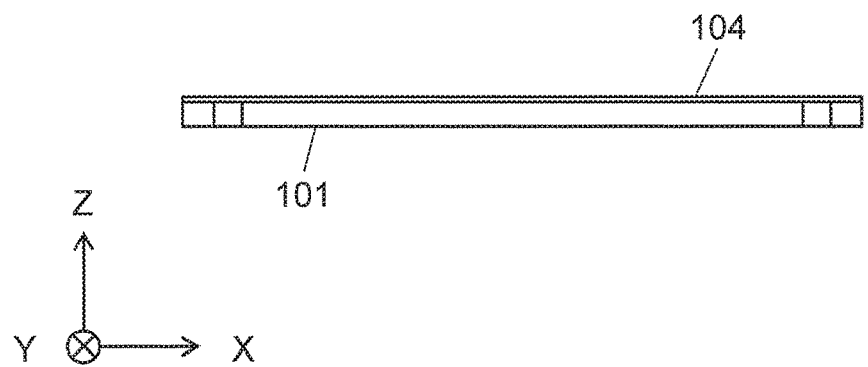
FIG. 1B is a lateral view of the substrate in accordance with the first embodiment.

FIG. 1A is a plan view showing substrate 101 in accordance with the first embodiment. FIG. 1B is a lateral view of substrate 101. Substrate 101 to be used in phosphor wheel 111 (refer to FIG. 6A) of the first embodiment is made of aluminum and shapes like a disc. Disc-shaped substrate 101 includes mounting hole 102 at center O. A rotary shaft of motor 112 (refer to FIG. 12) is to be mounted to mounting hole 102. Substrate 101 can be thus driven by motor 112.

Three cut-out sections 103 are formed on substrate 101 at the rim at intervals of 120° along the circumferential direction. Assume that the shortest length from center O of substrate 101 to an edge of the cut out section is R1. In this first embodiment, the length from center O to inner edge 103a of cut-out section 103 corresponds to this length R1. On at least one surface of substrate 101, enhanced reflective film layer 104 is formed in order to increase a surface diffusion reflectance. This enhanced reflective film layer 104 is made of an under coat and a top coat (not shown).

Figure 2A:
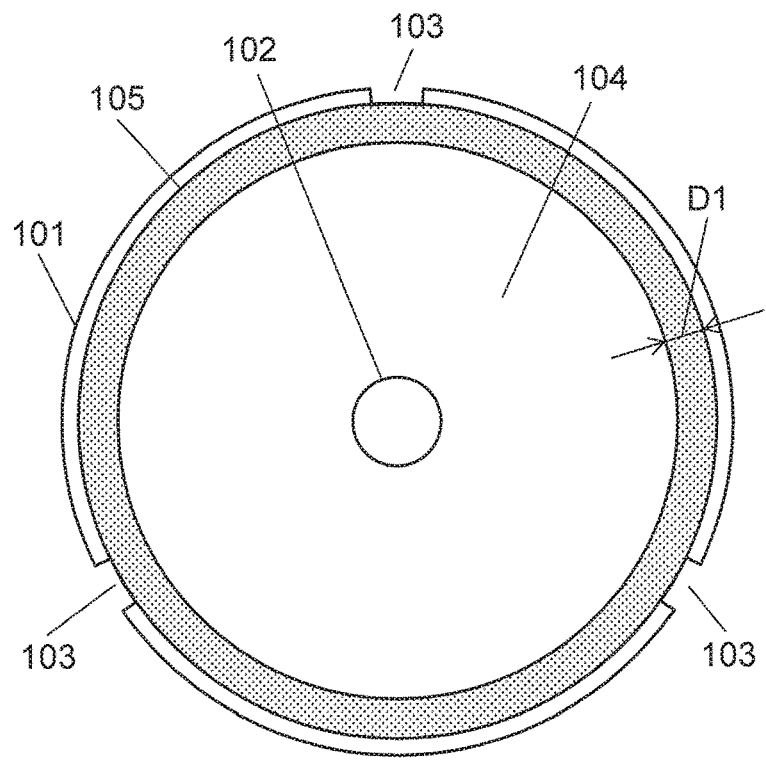
FIG. 2A is a plan view of the substrate, on which an adhesive layer is formed, in accordance with the first embodiment.
Figure 2B:
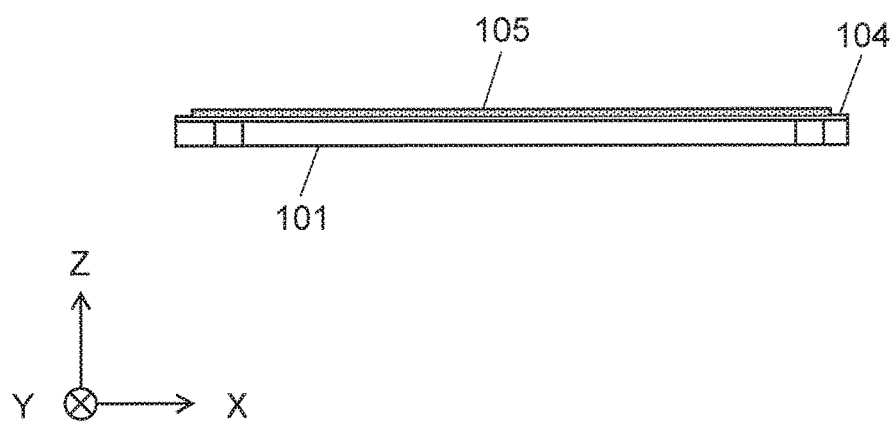
FIG. 2B is a lateral view of the substrate, on which the adhesive layer is formed, in accordance with the first embodiment.

FIG. 2A is a plan view showing substrate 101 on which adhesive layer 105 is formed. FIG. 2B is a lateral view showing substrate 101 on which adhesive layer 105 is formed.

As shown in FIG. 2A and FIG. 2B, ring-shaped adhesive layer 105 having a given width is formed on enhanced reflective film layer 104 at the circumference equidistant from center O of substrate 101. Width D1 shown in FIG. 2A extends widthwise in a radial direction of adhesive layer 105, and corresponds to the foregoing given width. To form adhesive layer 105, an dispensing nozzle (not shown) is disposed at a place, where adhesive layer 105 is to be formed, on substrate 101, then an adhesive agent is discharged from the nozzle while substrate 101 is rotated around center O, whereby ring-shaped adhesive layer 105 having the given width can be formed on the circumference equidistant from center O of substrate 101. The adhesive agent contains particles 107 (refer to FIG. 6B) in silicone resin 106 (refer to FIG. 6B) for increasing a diffuse reflectance and a heat conductivity.

The adhesive agent forming adhesive layer 105 is preferably made of silicone resin, because this material allows reducing the distortion produced by a difference in thermal expansion coefficient between substrate 101 and the phosphor layer (i.e. phosphor ring 108, refer to FIG. 5A), and also allows maintaining the structure of phosphor wheel 111. Considering the properties of reducing the distortion, the silicone resin to be used in the adhesive agent is preferably one of dimethyl-based silicone resins.

Figure 3A:
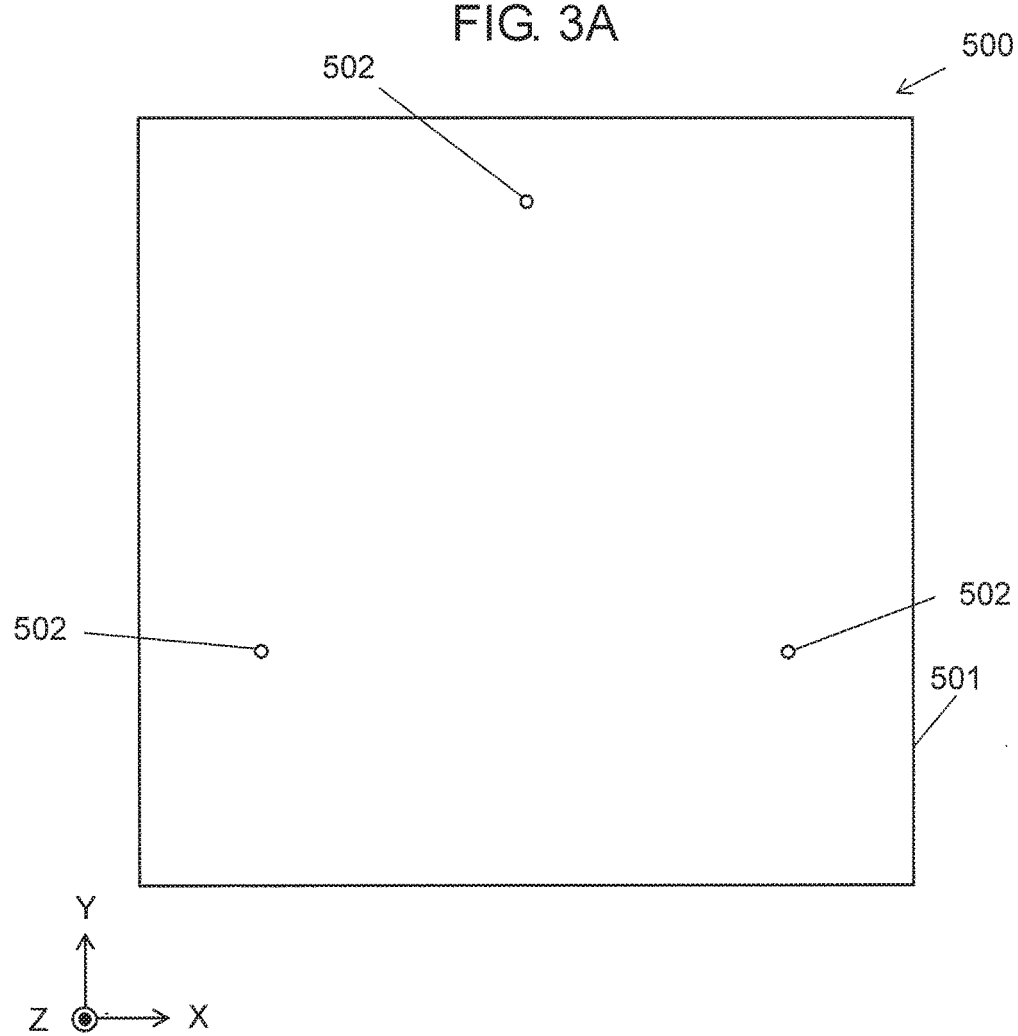
FIG. 3A is a plan view illustrating a positioning jig to be used in the first embodiment.
Figure 3B:
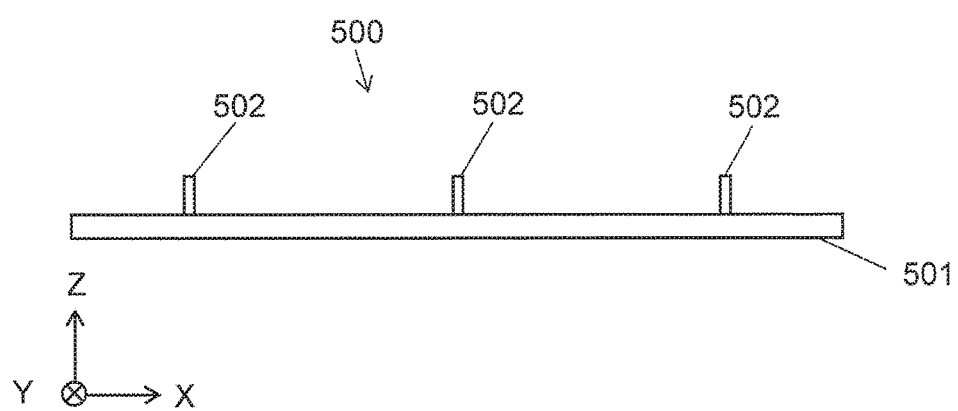
FIG. 3B is a lateral view illustrating the positioning jig to be used in the first embodiment.
Figure 4:
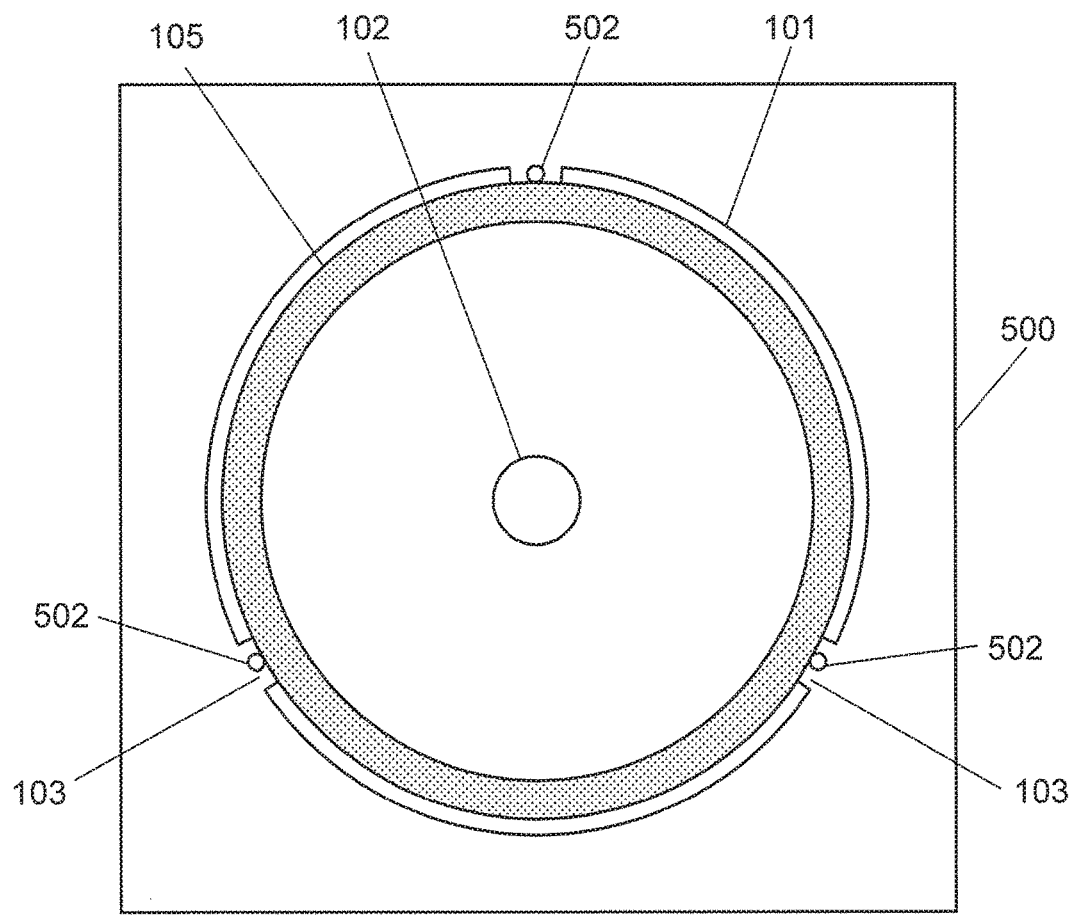
FIG. 4 is a plan view illustrating the substrate, used in the first embodiment, mounted to the positioning jig.

FIG. 3A is a plan view of positioning jig 500 in accordance with the first embodiment, and FIG. 3B is a lateral view thereof. Positioning jig 500 is formed of base 501 and three positioning pins 502 disposed on base 501. Each of these positioning pins 502 is positioned at each of inner edges 103a of cut out sections 103. FIG. 4 is a plan view illustrating substrate 101 mounted to positioning jig 500. Substrate 101, on which adhesive layer 105 is formed, is mounted to jig 500 as shown in FIG. 4.

Figure 5A:
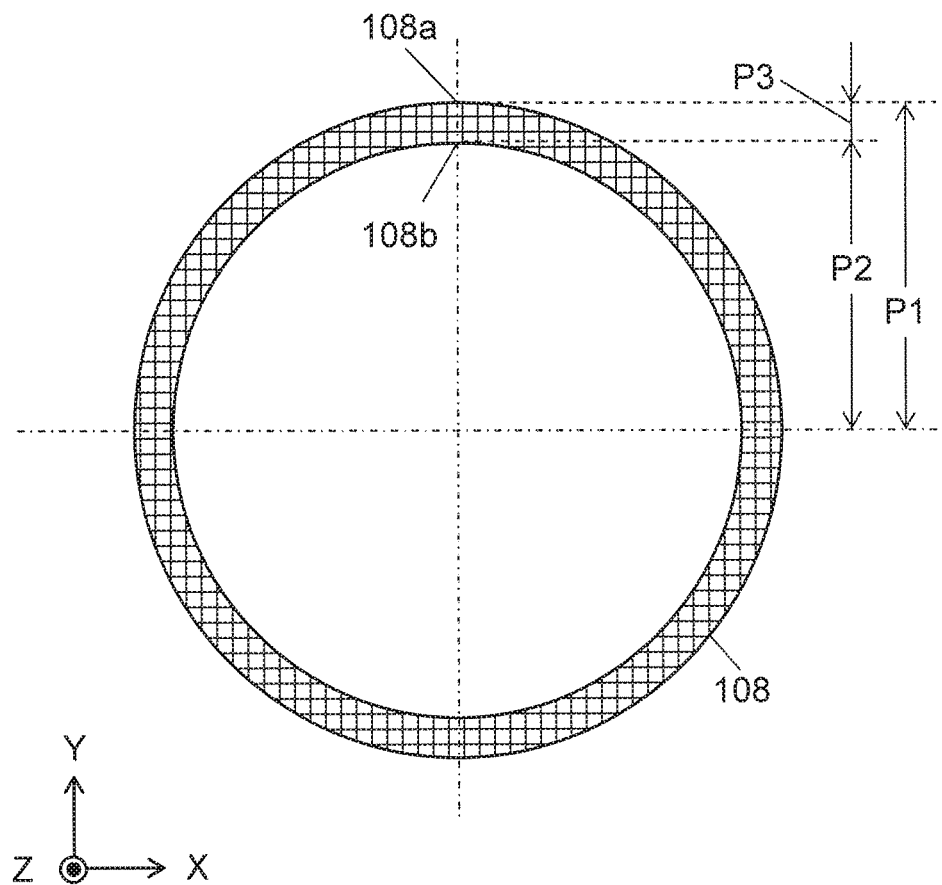
FIG. 5A is a plan view illustrating a phosphor ring in accordance with the first embodiment.
Figure 5B:
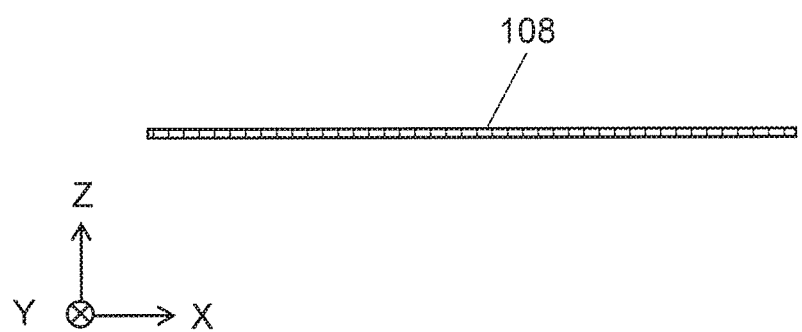
FIG. 5B is a lateral view illustrating the phosphor ring in accordance with the first embodiment.
Figure 6A:
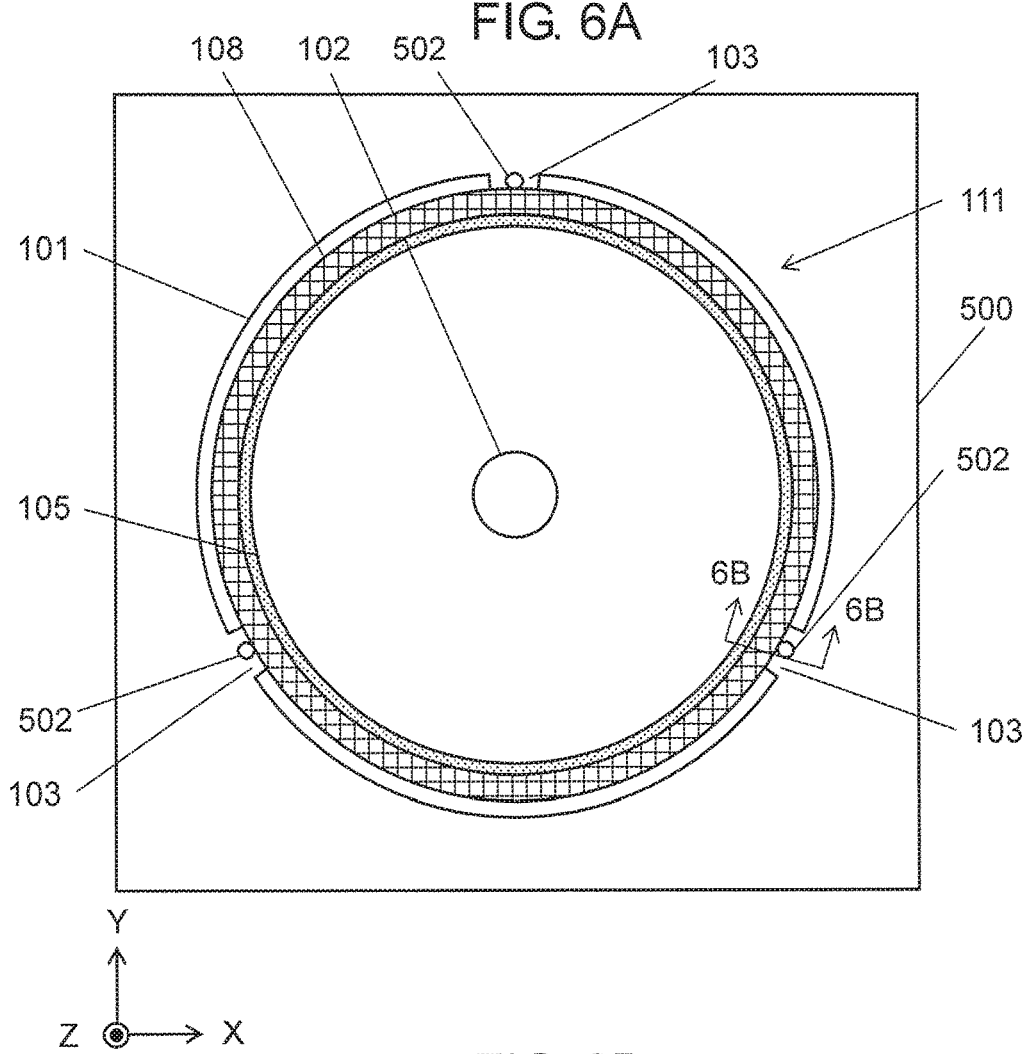
FIG. 6A is a plan view illustrating the substrate and the phosphor ring mounted to the positioning jig in accordance with the first embodiment.
Figure 6B:
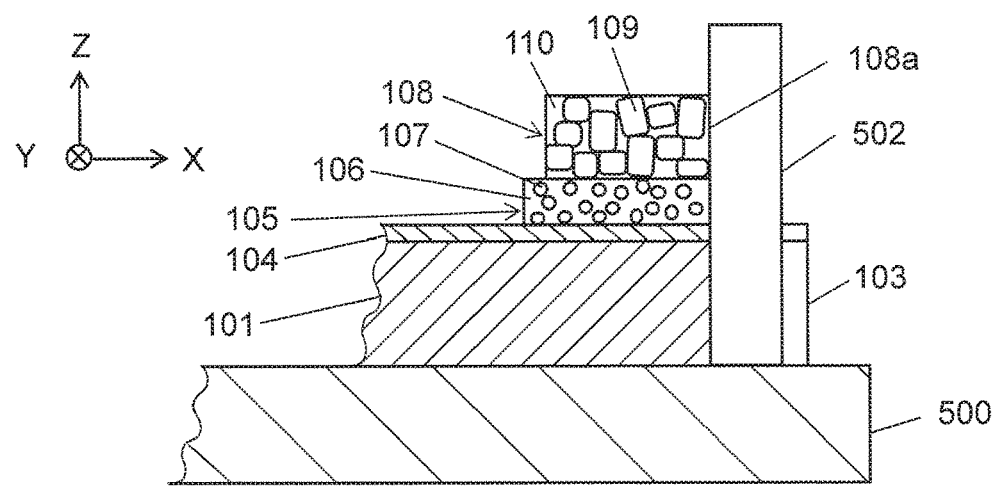
FIG. 6B is an enlarged sectional view cut along line 6B-6B in FIG. 6A.

FIG. 5A is a plan view of phosphor ring 108 in accordance with the first embodiment, and FIG. 5B is a lateral view thereof. FIG. 6A is a plan view illustrating positioning jig 500 with substrate 101 and phosphor ring 108 being mounted thereto. FIG. 6B is an enlarged sectional view cut along line 6B-6B in FIG. 6A. As shown in FIG. 6B, phosphor ring 108 is formed of phosphor particles 109 and binder 110 which is a mixture. Phosphor particles 109 are excited by excitation light for emitting fluorescent light. As shown in FIG. 5A, the ring shape of phosphor ring 108 is formed in advance such that a radius of outer circumference 108a is radius P1, a radius of inner circumference 108b is radius P2, and a width in radius direction is width P3.

Binder 110 is preferably a mixture chiefly made of highly heat conductive inorganic substance such as alumina. Alumina has heat conductivity as much as 10 times or greater than that of dimethyl-based silicone, so that phosphor particles 109 and binder 110 that is the mixture chiefly made of alumina can make phosphor ring 108 (i.e. phosphor layer) highly heat conductive.

As FIG. 1A, FIG. 5A, and FIG. 6A show, the shortest length R1 from center O to the inner edges 103a of cut-out sections 103 is generally equal to radius P1 of outer circumference 108a of phosphor ring 108. The expression of "generally equal to" in this context refers to length R1 is equal to radius P1. (i.e. R1=P1), or length R1 is greater than radius P1 (i.e. R1>P1) but in approximation. In this first embodiment, width 101 of adhesive layer 105 is somewhat greater than width P3 of phosphor ring 108; however, they can be equal to each other.

As discussed above and as shown in FIG. 6A, phosphor ring 108 is disposed such that outer circumference 108a is brought into contact with positioning pins 502. This structure allows phosphor ring 108 to be placed at a given position on adhesive layer 105 formed on enhanced reflective film layer 104. This given position refers to a region falling within the range from not greater than length. P1 to not smaller than length. P2 in the radius direction from center O of substrate 101. After the placement of phosphor ring 108, the adhesive agent is cured with heat so that phosphor ring 108 can be fixedly bonded to substrate 101. Phosphor wheel 111 is thus formed. In other words, phosphor wheel 111 is formed of substrate 101, enhanced reflective film layer 104, adhesive layer 105, and phosphor ring 108 (i.e. phosphor layer). The rotary shaft of motor 112 is mounted to phosphor wheel 111 at mounting hole 102, whereby phosphor wheel 111 can work as phosphor wheel device 1 that can be rotated.

In this first embodiment, three cut-out sections 103 are formed; however, the number of the cut-out sections 103 is not limited to three, but at least three cut-out sections 103 are needed, so that four or more than four cut-out sections 103 can work well. The positions of cut-out sections 103 are not specifically limited to 120° intervals as far as they can balance phosphor wheel 111 during the rotation. In this first embodiment, cut-out sections 103 are formed at the rim of substrate 101; however, the openings can be formed at the rim. In this case, the openings are formed such that the shortest length from center O of substrate 101 to inner edges of the openings can be generally equal to radius P1 of outer circumference 108a of phosphor ring 108, so that the same advantage as that of the case, where cut-out sections 103 are formed, can be obtained.

The material for substrate 101 is not limited to aluminum as far as it is a metal having an excellent heat dissipation. Materials other than aluminum are, for instance, ceramic materials such as glass or alumina, metals such as copper or stainless steel. Adhesive layer 105 can be formed by a screen printing instead of using the dispensing nozzle.

1-2. Advantage

In assembling the phosphor wheel in accordance with the first embodiment, phosphor ring 108 is bonded to substrate 101. At this time, substrate 101 on which adhesive layer 105 is formed is placed on base 501 that includes positioning pins 502 at the places corresponding to cut-out sections 103 of substrate 101, by passing positioning pins 502 through cut-out sections 103. Then phosphor ring 108 is placed on substrate 101 such that outer circumference 108a is brought into contact with positioning pins 502 before bonding them together.

The structure discussed above allows bonding phosphor ring 108 to substrate 101 with phosphor ring 108 and substrate 101 being positioned to each other at given places. As a result, the accuracy of positioning phosphor ring 108 (i.e. phosphor layer) onto substrate 101, before phosphor ring 108 is bonded to substrate 101, can be improved, so that the rotary center of substrate 101 coincides with the rotary center of phosphor ring 108. Phosphor ring 108 can be thus bonded to substrate 101 with the balance during the rotations of them being adjusted.

Second Exemplary Embodiment 2-1. Structure of the Phosphor Wheel and Method for Manufacturing the Phosphor Wheel The phosphor wheel in accordance with the second embodiment is demonstrated hereinafter with reference to FIG. 7A-FIG. 11B.

Figure 7A:
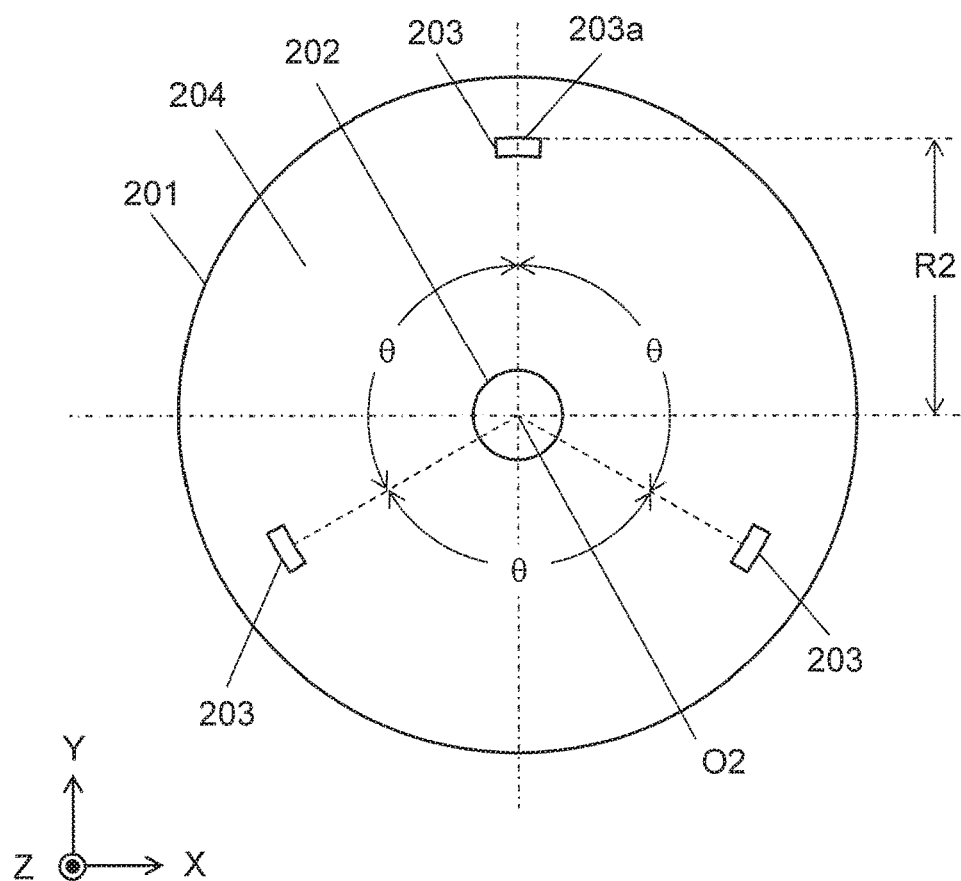
FIG. 7A is a plan view of a substrate in accordance with a second embodiment of the present disclosure.
Figure 7B:
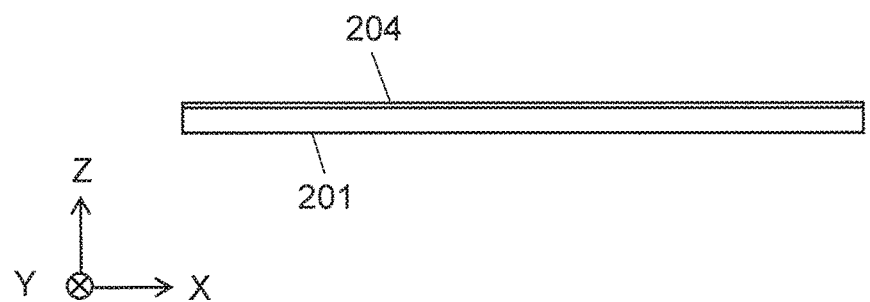
FIG. 7B is a lateral view of the substrate in accordance with the second embodiment.

FIG. 7A is a plan view of substrate 201 in accordance with the second embodiment, and FIG. 7B is a lateral view thereof. Substrate 201 to be used in phosphor wheel 211 (refer to FIG. 11A) in accordance with the second embodiment is made of aluminum and shapes like a disc. Disc-shaped substrate 201 includes mounting hole 202 at center O2. A rotary shaft of motor 112 (refer to FIG. 12) is to be mounted to center O2. Substrate 201 is thus driven by motor 112.

Three openings 203 are formed on substrate 201 at intervals of 120° along the circumferential direction. Assume that the longest length from center O2 of substrate 201 to an outer edge of opening 203 is R2. In this second embodiment, the length from center O2 to outer edge 203a of opening 203 corresponds to this length R2. On at least one surface of substrate 201, enhanced reflective film layer 204 is formed in order to increase a surface diffusion reflectance. This enhanced reflective film layer 204 is made of an under coat and a top coat (not shown).

Figure 8A:
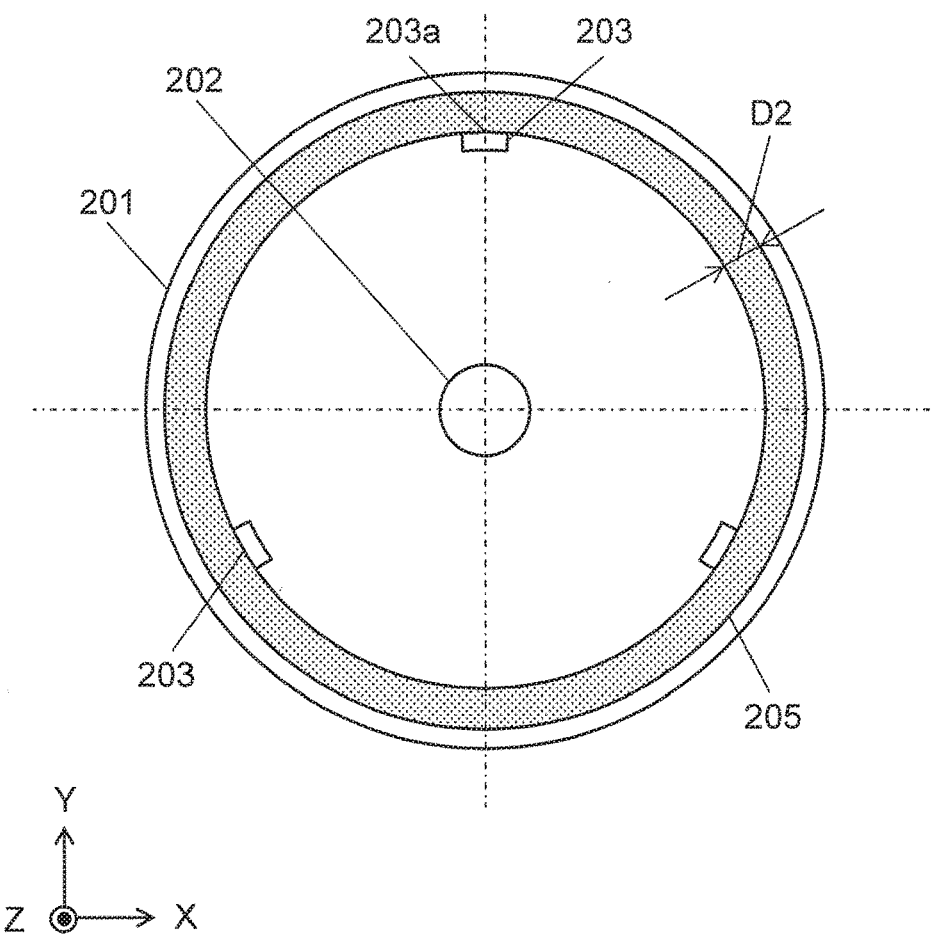
FIG. 8A is a plan view of the substrate, on which an adhesive layer is formed, in accordance with the second embodiment.
Figure 8B:
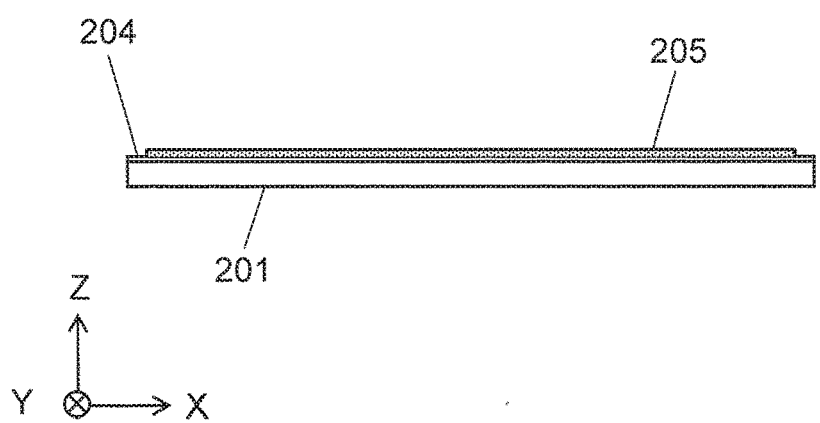
FIG. 8B is a lateral view of the substrate, on which the adhesive layer is formed, in accordance with the second embodiment.

FIG. 8A is a plan view of substrate 201 with adhesive layer 205 being formed thereon, and FIG. 8B is a lateral view thereof. As shown in FIG. 8A and FIG. 8B, on enhanced reflective film layer 204, ring-shaped adhesive layer 205 having a given width is formed on a circumference equidistant from center O2 of substrate 201. Width D2 shown in FIG. 8A is a width in the radius direction of adhesive layer 205, and corresponds to the given width. To form adhesive layer 205, an dispensing nozzle (not shown) is placed at a place, where adhesive layer 205 is to be formed, on substrate 201, then an adhesive agent is discharged from the nozzle while substrate 201 is rotated around center O2, whereby ring-shaped adhesive layer 205 having the given width can be formed on the circumference equidistant from center O2 of substrate 201. The adhesive agent contains particles 207 (refer to FIG. 11B) in silicone resin 206 (refer to FIG. 11B) for increasing a diffuse reflectance and a heat conductivity.

The adhesive agent forming adhesive layer 205 is preferably made of silicone resin, because this material allows reducing the distortion produced by a difference in thermal expansion coefficient between substrate 201 and the phosphor layer i.e. phosphor ring 208 (refer to FIG. 10A), and also allows maintaining the structure of phosphor wheel 211. Considering the characteristics of reducing the distortion, the silicone resin to be used in the adhesive agent is preferably one of dimethyl-based silicone resins.

In this second embodiment, positioning jig 500 as shown in FIG. 3A is used. Jig 500 is formed of base 501 and positioning pins 502. Positioning jig 500 is placed such that positioning pins 502 are in contact with outer edge 203a of opening 203 in order to work effectively in the second embodiment. FIG. 9 is a plan view illustrating substrate 201 mounted to positioning jig 500. Substrate 201 on which adhesive layer 205 is formed is mounted to jig 500 as illustrated in FIG. 9.

Figure 10A:
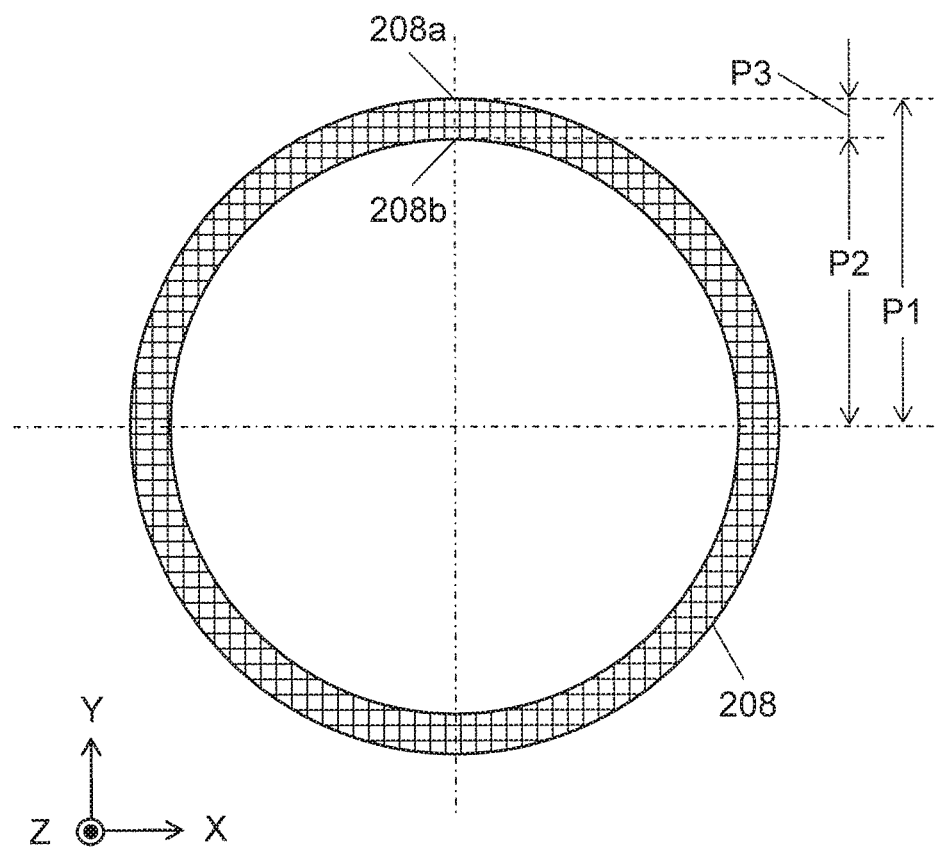
FIG. 10A is a plan view illustrating a phosphor ring in accordance with the second embodiment.
Figure 10B:
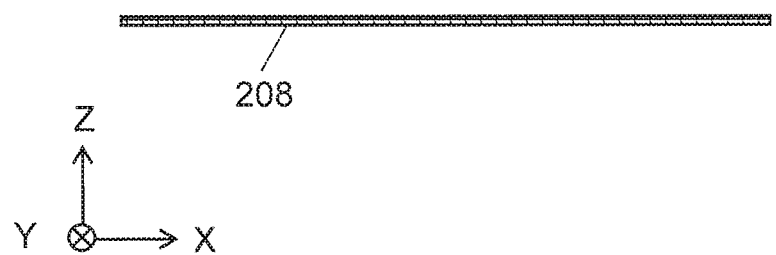
FIG. 10B is a lateral view illustrating the phosphor ring in accordance with the second embodiment.
Figure 11A:
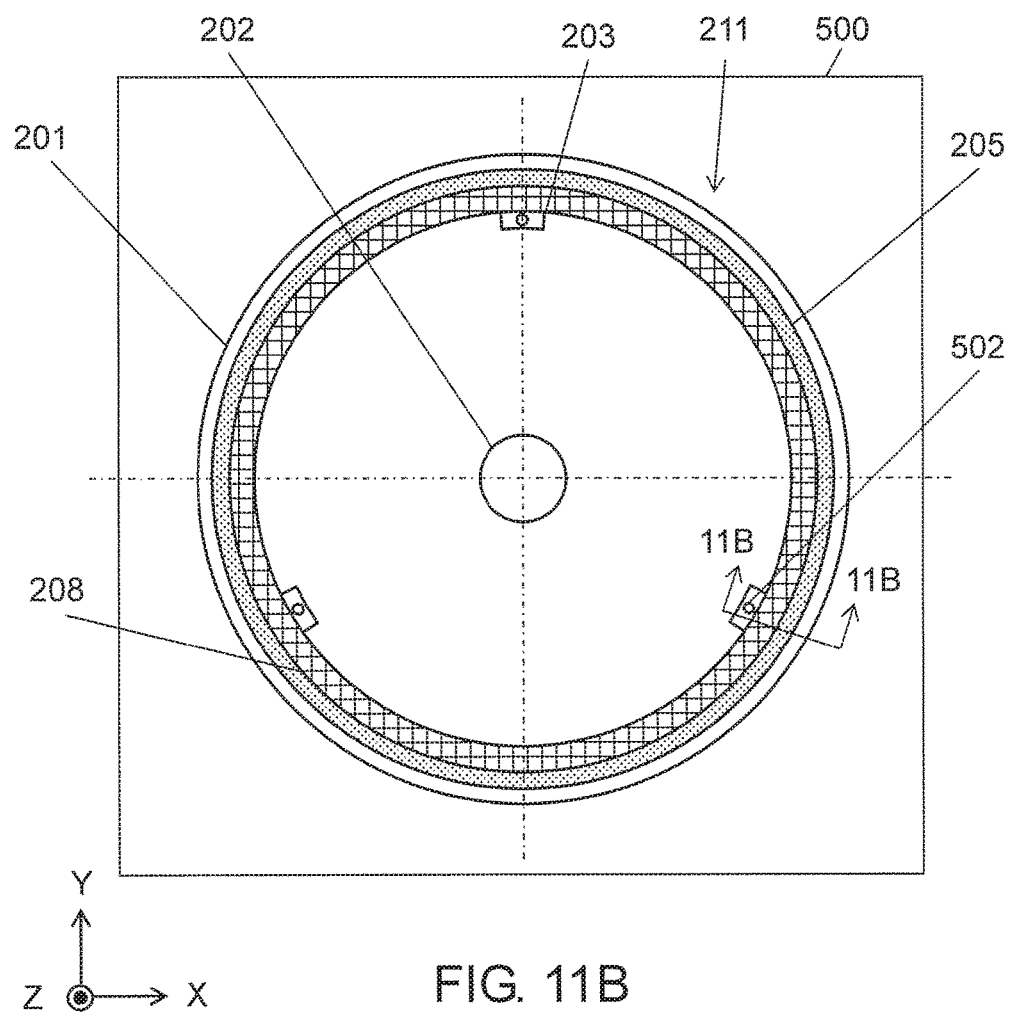
FIG. 11A is a plan view illustrating the substrate and the phosphor ring mounted to the positioning jig in accordance with the second embodiment.
Figure 11B:
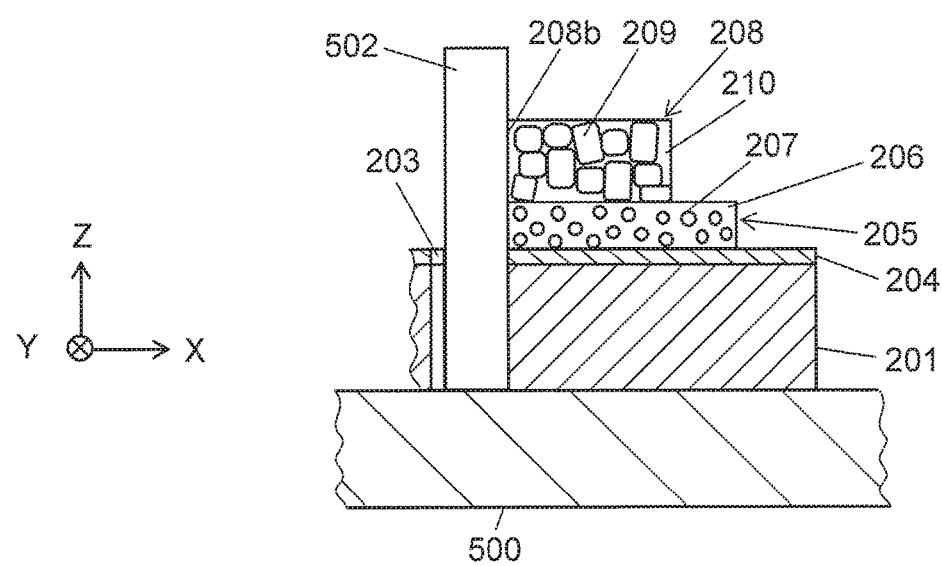
FIG. 11B is an enlarged sectional view cut along line 11B-11B in FIG. 11A.

FIG. 10A is a plan view of phosphor ring 208 in accordance with the second embodiment, and FIG. 10B is a lateral view thereof. FIG. 11A is a plan view illustrating substrate 201 and phosphor ring 208 mounted to positioning jig 500, and FIG. 11B is an enlarged sectional view cut along line 11B-11B in FIG. 11A. As shown in FIG. 11B, phosphor ring 208 is formed of phosphor particles 209 and binder 210 that is a mixture. Phosphor particles 209 are excited by excitation light for emitting fluorescent light. As shown in FIG. 10A, the ring shape of phosphor ring 208 is formed in advance such that a radius of outer circumference 208a is radius P1, a radius of inner circumference 208b is radius P2, and a width in radius direction is width P3.

Binder 210 is preferably a mixture chiefly made of highly heat conductive inorganic substance such as alumina. Alumina has heat conductivity as much as 10 times or greater than that of dimethyl-based silicone, so that phosphor particles 209 and binder 210 that is the mixture chiefly made of alumina can make phosphor ring 208 (phosphor layer) highly heat conductive.

As FIG. 7A, FIG. 10A, and FIG. 11A show, the longest length R2 from center O2 of substrate 201 to the outer edge 203a of opening 203 is generally equal to radius P2 of inner circumference 208b of phosphor ring 208. The expression of "generally equal to" in this context refers to length R2 is equal to radius P2 (i.e. R2=P2), or length R2 is smaller than radius P2 (i.e, R2<P2) but in approximation. In this second embodiment, width D2 of adhesive layer 205 is somewhat greater than width P3 of phosphor ring 208; however, they can be equal to each other.

As discussed above, as shown in FIG. 11A, phosphor ring 208 is disposed such that inner circumference 208b is brought into contact with positioning pins 502. This structure allows phosphor ring 208 to be placed at a given position on adhesive layer 205 formed on enhanced reflective film layer 204. This given position refers to a region falling within a range from not greater than length P1 to not smaller than length P2 in the radius direction from center O2 of substrate 201. After the placement of phosphor ring 208, the adhesive agent is cured with heat so that phosphor ring 208 can be fixedly bonded to substrate 201. Phosphor wheel 211 is thus formed. In other words, phosphor wheel 211 is formed of substrate 201, enhanced reflective film layer 204, adhesive layer 205, and phosphor ring 208 (i.e. phosphor layer). The rotary shaft of motor 112 is mounted to phosphor wheel 211 at mounting hole 202, whereby phosphor wheel 211 can work as phosphor wheel device 10 that can be rotated.

In this second embodiment, three openings 203 are formed; however, the number of the openings 203 is not limited to three, but at least three openings 203 are needed, so that four or more than four openings 203 can work well. The positions of openings 203 are not specifically limited to 120° intervals as far as they can balance phosphor wheel 211 during the rotation.

The material for substrate 201 is not limited to aluminum as far as it is a metal of excellent heat dissipation. Materials other than aluminum are, for instance, ceramic materials such as glass or alumina, metals such as copper or stainless steel. Adhesive layer 205 can be formed by a screen printing instead of using the dispensing nozzle.

2-2. Advantage

In assembling the phosphor wheel in accordance with the second embodiment, phosphor ring 208 is bonded to substrate 201. At this time, substrate 201 on which adhesive layer 205 is formed is placed on base 501 having positioning pins 502 at the places corresponding to openings 203 of substrate 201, by passing positioning pins 502 through openings 203. Then phosphor ring 208 is placed on substrate 201 such that inner circumference 208b is brought into contact with positioning pins 502 before bonding them together.

The structure discussed above allows bonding the phosphor ring 208 to substrate 201 with substrate 201 and phosphor ring 208 being positioned to each other at given places. As a result, the accuracy of positioning the phosphor ring 208 (i.e. phosphor layer) onto substrate 201 can be improved, so that the rotary center of substrate 201 coincides with the rotary center of phosphor ring 208. Phosphor ring 208 can be thus bonded to substrate 201 with the balance during the rotations of them being adjusted.

3-1. Light Source Device Employing Phosphor Wheel

Figure 12:
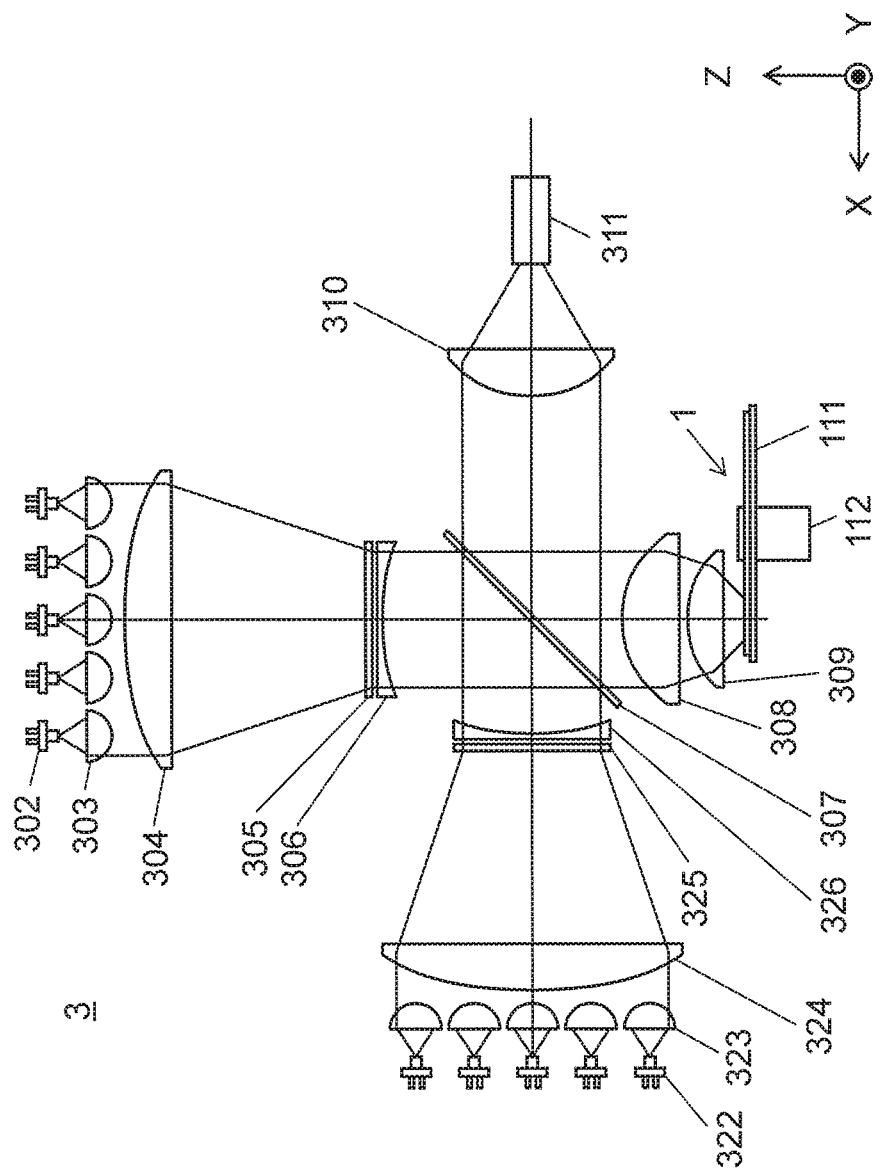
FIG. 12 shows a structure of a light source device including the phosphor wheel in accordance with the first embodiment.

FIG. 12 shows a structure of light source device 3 employing phosphor wheel 111 in accordance with the first embodiment. In this case, phosphor wheel 211 in accordance with the second embodiment can replace phosphor wheel 111; however, for convenience, phosphor wheel 111 is used in this description. Phosphor wheel device 1 is thus formed of phosphor wheel 111 and motor 112 that drives phosphor wheel 111.

The outgoing light from multiple first laser light sources 302 is collimated by collimator lenses 303 disposed on the outgoing sides of respective first laser light sources 302. Convex lens 304 is disposed on the outgoing sides of collimator lenses 303. This convex lens 304 gathers the outgoing light from first laser light sources 302 and from collimator lenses 303 for narrowing the light beam. Convex lens 304 can also cancel the ununiformity, which have appeared in the light beam when the light passed through collimator lenses 303, of the light beam emitted from first laser light sources 302. The outgoing light, of which light beam has been narrowed by convex lens 304, enters diffuser plate 305 disposed on the outgoing side of convex lens 304. Diffuser plate 305 further cancels the still-remaining ununiformity of the light beam. First laser light source 302 is an example of the excitation light source.

The outgoing light from diffuser plate 305 enters concave lens 306, which collimates the incoming light from diffuser plate 305.

The collimated outgoing light from concave lens 306 enters dichroic mirror 307 disposed on the outgoing side at 45' with respect to the optical axis. Dichroic mirror 307 transmits light having a wavelength range of the outgoing light from first laser light sources 302, and reflects light having a wavelength range of outgoing fluorescent light (described later) from phosphor wheel 111. The light incoming from concave lens 306 thus penetrates through dichroic mirror 307, and then enters multiple convex lenses 308 and 309 in this order, whereby the light beam is converged before entering phosphor wheel 111.

Phosphor wheel 111 is placed such that phosphor ring 108, working as the phosphor layer, confronts convex lenses 308 and 309. Phosphor wheel 111 includes, as shown in FIG. 6A, phosphor ring 108 placed on the circumference equidistant from the rotary center of phosphor wheel 111. The rotation of phosphor wheel 111 allows the outgoing light from first laser light sources 302 and converged by convex lenses 308 and 309 in this order to illuminate phosphor ring 108. In this structure, collimator lenses 303, convex lens 304, diffuser plate 305, concave lens 306, dichroic mirror 307, and convex lenses 308, 309 are examples of a light guiding optical system.

A part of the excitation light, which has entered phosphor ring 108 (i.e. phosphor layer), supplied from first laser light sources 302 excites phosphor particles 109 in the phosphor layer. The excited phosphor particles 109 emit fluorescent light, having a wavelength range different from that of first laser light sources 302, toward convex lens 309. The fluorescent light having entered convex lens 309 outgoes toward convex lens 308, and enters convex lens 308, where the fluorescent light is collimated, and outgoes toward dichroic mirror 307 before entering dichroic mirror 307.

Dichroic mirror 307 is disposed, as discussed previously at 45° with respect to the optical axis of the fluorescent light. Dichroic mirror 307 transmits the light having the wavelength of the outgoing light from first laser light sources 302, and reflects the light having the wavelength range of the outgoing fluorescent light from phosphor wheel 111. A traveling direction of the fluorescent light having entered dichroic mirror 307 is deflected by 90°.

Next, outgoing light from multiple second laser light sources 322 is collimated by collimator lenses 323 disposed on the outgoing sides of respective second, laser light sources 322. Convex lens 324 is disposed on the outgoing sides of collimator lenses 323. This convex lens 324 gathers the outgoing light from second laser light sources 322 and from collimator lenses 323 for narrowing the light beam. Convex lens 324 can, also cancel the ununiformity, which have appeared in the light beam when the light passed through collimator lenses 323, of the light beam emitted from second laser light sources 322. The outgoing light, of which light beam has been narrowed by convex lens 324, enters diffuser plate 325 disposed on the outgoing side of convex lens 324. Diffuser plate 325 further cancels the still-remaining ununiformity of the light beam.

The outgoing light from diffuser plate 325 enters concave lens 326, which collimates the incoming light from diffuser plate 325.

The collimated outgoing light from concave lens 326 enters dichroic mirror 307 along a direction different by 90° from the fluorescent light outgoing from phosphor wheel 111. Dichroic mirror 307 is disposed on the outgoing side at 45° with respect to the optical axis. Dichroic mirror 307 transmits light having a wavelength range of the outgoing light from second laser light sources 322, and reflects light having a wavelength range of the outgoing fluorescent light from phosphor wheel 111. The light incoming from concave lens 326 thus penetrates through dichroic mirror 307. As a result, the outgoing fluorescent light from phosphor wheel 111 and the outgoing light from the second laser light sources 322 outgo in the same direction.

The outgoing fluorescent light from phosphor wheel 111 and the outgoing laser light from second laser light sources 322 are converged by convex lens 310, and then enter rod integrator 311 that is a light-uniformizing means, so that the light intensity distribution of the outgoing light from rod integrator 311 is uniformed.

The outgoing light from second laser light sources 322 has a wavelength range of blue, and the outgoing light from first laser light sources 302 has a wavelength falling within a range from ultraviolet color to blue color. Phosphor particles 109 contained in phosphor ring 108 of phosphor wheel 111 is excited by the light having a wavelength range of the first laser light sources 302, and then emit yellow fluorescent light having the wavelength ranges both of green and red.

The structure discussed above allows rod integrator 311 of light source device 3 to emit white light of which light intensity distribution is uniformed.

Figure 13:
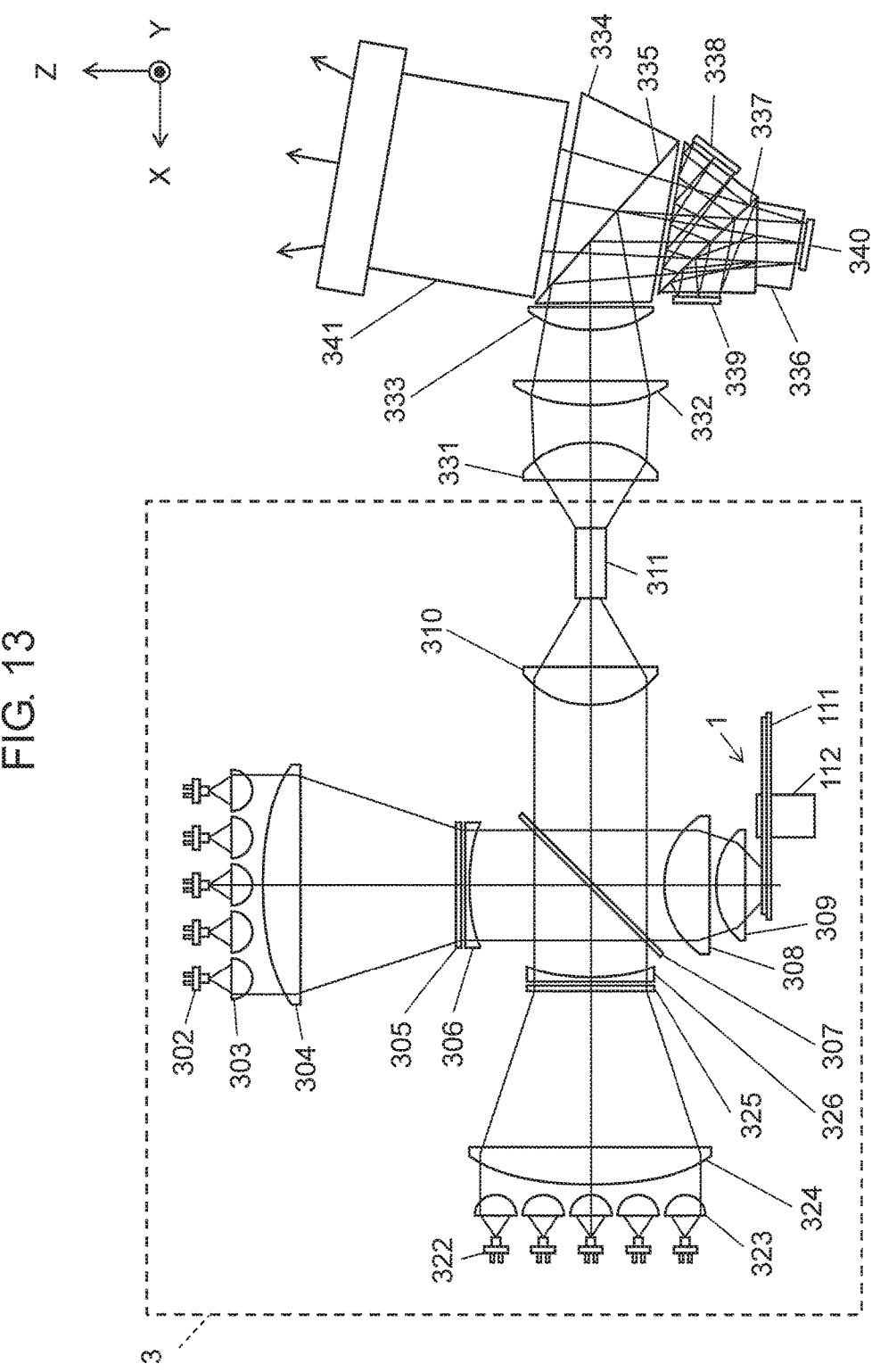
FIG. 13 shows a structure of a projector-type image display apparatus including the light source device in accordance with the first embodiment.

3-2. Projector-Type Image Display Apparatus Employing Light Source Device Including Phosphor Wheel FIG. 13 shows a structure of a projector-type image display apparatus employing light source device 3 in accordance with the first embodiment. The projector-type image display apparatus includes light source device 3 described with reference to FIG. 12. The description of light source device 3 is omitted here because it was described already. In this section, a behavior of the outgoing white light from rod integrator 311 and a structure of the projector-type image display apparatus are demonstrated hereinafter.

The outgoing white light from rod integrator 311 maps an image, formed on the outgoing-side face of rod integrator 311, onto DMD (digital micro-mirror device) 338, 339, and 340 with the aid of a relay lens system formed of three lenses 331, 332, and 333.

The light penetrates through lenses 331, 332, and 333 (these lenses constitute the relay lens system), and then enters total reflection prism 334 that is formed of two glass blocks and a small gap 335 disposed between the two glass blocks. The light having entered the total reflection prism 334 reflects from small gap 335, and then enters color prism 336 formed of three glass blocks. Color prism 336 includes small gap 337 between a first glass block and a second glass block, and a dichroic surface on the first glass block side. This dichroic surface reflects the light having a wavelength range of blue color.

Some light, having the wavelength range of blue color, of the white color having entered color prism 336 reflects from the dichroic surface that reflects the light of blue-color region and is provided to the first glass block disposed in front of small gap 337 of color prism 336, and then totally reflects from the clearance disposed between color prism 336 and total reflection prism 334. The light thus changes the traveling direction, and enters DMD 338 working for blue color.

Next, the yellow light including both regions of red-color and green-color and traveling through small gap 337 of color prism 336 is separated into the red light and the green light by the dichroic surface disposed on an interface between the second glass block and the third glass block of color prism 336. This dichroic surface is to reflect the light having a wavelength range of red light and is to transmit the light having a wavelength range of green light. The separated red light reflects from the dichroic surface, and enters the second glass block. The separated green light penetrates through the dichroic surface, and enters the third glass block.

The red light reflecting from the interface between the second glass block and the third glass block enters, at an angle equal to or greater than a total reflection angle, small gap 337 formed between the second glass block and the first glass block, and then enters DMD 339 working for red color.

The green light having entered the third glass block travels straight as it is, and then enters DMD 340 working for green color.

Three sheets of DMD 338, 339, and 340 are driven by an image circuit (not shown), and ON/OFF of each pixel is switched over in response to image information, whereby the reflection direction is changed.

The light from pixels, assigned to ON, of three sheets of DMD 338, 339, and 340, travels reversely through the forgoing route, and is synthesized by color prism 336 before turning into the white light, which then enters total reflection prism 334. The light having entered total reflection prism 334 enters small gap 335 of total reflection prism 334 at an angle equal to or smaller than the total reflection angle, and penetrate through prism 334. The light is finally magnified and projected onto a screen (not shown) by projection lens 341.

INDUSTRIAL APPLICABILITY

The present disclosure is applicable to a lighting device of a projector-type image display apparatus.

What is claimed is:

1. A phosphor wheel comprising:
    a disc-shaped substrate; and
    a phosphor ring fixedly bonded to the substrate,
    wherein at least three cut-out sections or openings are disposed at a rim of the substrate, and a shortest length from a center of the substrate to inner edges of the cut-out sections or inner edges of the openings is generally equal to a radius of an outer circumference of the phosphor ring such that, when at least three positioning pins are each positioned along an edge of a corresponding one of the at least three cut-out sections or openings, the outer circumference of the phosphor ring is positioned along each of at least three positioning pins.

2. A light source device comprising:
    an excitation light source;
    a light guiding optical system for guiding outgoing light from the excitation light source; and
    the phosphor wheel as defined in claim 1,
    wherein excitation light from the light guiding optical system illuminates the phosphor ring of the phosphor wheel for emitting fluorescent light.

3. A projection video display device comprising the light source device as defined in claim 2.

4. The phosphor wheel of claim 1, wherein the shortest lengths from the center of the substrate to the inner edge of each of the at least three cut-out sections or openings are equal.

5. The phosphor wheel of claim 1, wherein the at least three cut-out sections or openings are located so that balance of rotation of the phosphor wheel is retained.

6. The phosphor wheel of claim 1, wherein the at least three cut-out sections or openings are evenly spaced along the rim of the substrate.

7. The phosphor wheel of claim 1, wherein the at least three cut-out sections or openings each extend through a thickness of the substrate.

8. A phosphor wheel comprising:
a disc-shaped substrate; and
a phosphor ring fixedly bonded to the substrate,
wherein at least three openings are disposed on the substrate along a circumferential direction, and a longest length from a center of the substrate to outer edges of the openings is generally equal to a radius of an inner circumference of the phosphor ring such that, when at least three positioning pins are each positioned along the outer edge of a corresponding one of the at least three openings, the inner circumference of the phosphor ring is positioned along each of at least three positioning pins.

9. A light source device comprising:
an excitation light source;
a light guiding optical system for guiding outgoing light from the excitation light source; and
the phosphor wheel as defined in claim 8,
wherein excitation light from the light guiding optical system illuminates the phosphor ring of the phosphor wheel for emitting fluorescent light.

10. A projection video display device comprising the light source device as defined in claim 9.

11. The phosphor wheel of claim 8, wherein the longest lengths from the center of the substrate to the outer edges of each of the at least three openings are equal.

12. The phosphor wheel of claim 8, wherein the at least three openings are located so that balance of rotation of the phosphor wheel is retained.

13. The phosphor wheel of claim 8, wherein the at least three openings are evenly spaced along the circumferential direction of the substrate.

14. The phosphor wheel of claim 8, wherein the at least three openings each extend through a thickness of the substrate.

15. A method of manufacturing a phosphor wheel comprising:
mounting a disc-shaped substrate, having at least three cut-out sections or openings, on a positioning jig, having a base and at least three positioning pins disposed on the base, such that each of the at least three positioning pins is positioned along an edge of a corresponding one of the at least three cut-out sections or openings; and
mounting a phosphor ring to a surface of the disc-shaped substrate mounted on the positioning jig, such that a circumferential edge of the phosphor ring is positioned along each of the at least three positioning pins.

16. The method of claim 15, wherein:
the at least three cut-out sections or openings are disposed at a rim of the disc-shaped substrate,
the disc-shaped substrate is mounted on the positioning jig such that each of the at least three positioning pins contacts an inner edge of the corresponding one of the at least three cut-out sections or openings, and
the phosphor ring is mounted to the surface of the disc-shaped substrate on the positioning jig such that an outer circumferential edge of the phosphor ring is positioned along each of the at least three positioning pins.

17. The method of claim 16, wherein the mounting the disc-shaped substrate comprises mounting the disc-shaped substrate on the positioning jig such that each of the at least three positioning pins contacts the inner edge of the corresponding one of the at least three cut-out sections or openings.

18. The method of claim 16, wherein the mounting the phosphor ring comprises mounting the phosphor ring to the surface of the disc-shaped substrate mounted on the positioning jig such that the outer circumference of the phosphor ring contacts each of the at least three positioning pins.

19. The method of claim 15, further comprising:
the at least three cut-out sections or openings are at least three openings disposed on the disc-shaped substrate along a circumferential direction,
the disc-shaped substrate is mounted on the positioning jig such that each of the at least three positioning pins contacts an outer edge of the corresponding one of the at least three openings, and
the phosphor ring is mounted to the surface of the disc-shaped substrate on the positioning jig such that an inner circumferential edge of the phosphor ring is positioned along each of the at least three positioning pins.

20. The method of claim 19, wherein the mounting the disc-shaped substrate comprises mounting the disc-shaped substrate on the positioning jig such that each of the at least three positioning pins contacts the outer edge of the corresponding one of the at least three openings, or
the mounting the phosphor ring comprises mounting the phosphor ring to the surface of the disc-shaped substrate mounted on the positioning jig such that the inner circumferential edge of the phosphor ring contacts each of the at least three positioning pins.

* * * * *